Figure 1:
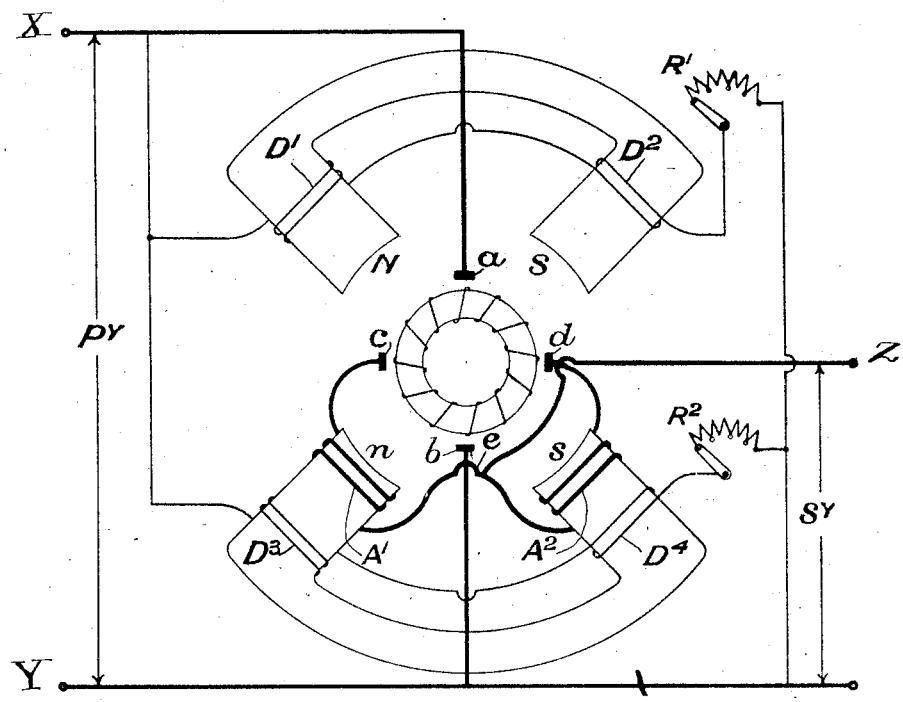

J. C. MACFARLANE & H. BURGE.
DYNAMO ELECTRIC MACHINE.
APPLICATION FILED APR. 5, 1909.

1,035,717.

Patented Aug. 13, 1912.

UNITED STATES PATENT OFFICE.

JAMES COLQUHOUN MACFARLANE AND HARRY BURGE, OF CHELMSFORD, ENGLAND, ASSIGNORS TO THE FIRM OF CROMPTON AND COMPANY LIMITED, OF ARC WORKS, CHELMSFORD, ENGLAND.

DYNAMO-ELECTRIC MACHINE.

1,035,717.     Specification of Letters Patent.     Patented Aug. 13, 1912.

Application filed April 5, 1909. Serial No. 488,043.

*To all whom it may concern:*

Be it known that we, JAMES COLQUHOUN MACFARLANE and HARRY BURGE, subjects of the King of Great Britain, residing at Arc Works, Chelmsford, in the county of Essex, England, engineers, have invented certain new and useful Improvements in Dynamo-Electric Machines, of which the following is a specification.

This invention relates to a dynamo electric machine of the kind which has a single ring armature, the said armature being divided into a motor part and a generator part (or multiples thereof) by a pair of auxiliary brushes such as are hereafter referred to, along a plane (or planes) which passes through the said brushes, and a field magnet also divided into a motor part and a generator part, each part being provided with independent windings.

We have hereinafter described our invention for simplicity in connection with a two-pole magnetic field.

If two brushes, hereinafter called for convenience the positive and negative main brushes, are placed in the ordinary neutral position, and are supplied with a constant potential difference, and if the field magnets are provided with suitable windings in the ordinary way, the armature will revolve at a definite speed, depending on well known conditions, and there will be a gradual rise of potential all around both sides of the commutator from the negative main brush to the positive main brush. If now two further brushes, hereinafter called for convenience the auxiliary brushes, are made to bear on opposite sides of the commutator at points approximately equi-distant from one of the main brushes, these two brushes will pick up approximately the same potential. If these brushes are joined together by means of a low resistance conductor, there will be practically no circulating current flowing between the brushes on no load. The potential that the auxiliary brushes will pick up will depend on their distance from the negative main brush, the potential of which for convenience is considered zero, so that by placing the auxiliary brushes at any equi-distant points on the commutator from the negative main brush they may be made to pick up any potential from approximately zero to approximately the potential of the positive main brush. The armature of such a machine may be considered to be divided into two parts along a plane which passes through the auxiliary brushes and is parallel to the axis of the armature shaft. The part between the plane passing through the auxiliary brushes and the positive main brush may be considered the motor part of the armature, and the part between the plane passing through the auxiliary brushes and the negative main brush may be considered the generator part of the armature.

The potential difference induced in the generator part of the armature, *i. e.* between the negative main brush and the auxiliary brushes is proportional to the number of conductors lying on the armature between the negative main brush and the plane passing through the auxiliary brushes, and also to the quantity of magnetism or magnetic flux, passing through the surface of the armature from the magnet poles, hereinafter called the generator poles, between the negative main brush and the plane passing through the auxiliary brushes. Similarly the potential difference generated in the motor part of the armature, *i. e.* between the plane passing through the auxiliary brushes and the positive main brush, is proportional to the number of conductors on the armature surface between the said plane and the positive main brush, and also to the quantity of magnetism, or magnetic flux, passing through the armature surface from the magnet poles, hereinafter called the motor poles, between the said plane and the positive main brush. In order, therefore, to vary the potential difference (hereinafter called the secondary potential difference) between the negative main brush and the auxiliary brushes, without altering the position of the auxiliary brushes on the commutator, it will be necessary to alter the relative values of magnetic flux passing through the surface of the armature on either side of the plane passing through the auxiliary brushes. This cannot be conveniently done without dividing each of the poles into two distinct parts, and providing each part with independent windings, the M. M. F. of which can be adjusted independently, either automatically or otherwise, to give the required values of magnetic flux on each side of the aforesaid plane. It is of no use altering the relative values of magnetic flux on either side of the aforesaid plane, in order to vary the secondary potential difference, unless a machine of this type is provided with a ring armature (that is to say an armature in which the conductors return to the commutator from the back end of the armature without cutting any magnetic flux) because if such a machine is provided with an ordinary drum wound armature, although the relative quantities of magnetism on either side of the aforesaid plane were changed, this could have no effect on the value of this secondary potential difference.

In a machine constructed in accordance with the principles set forth above, which may not only have the poles divided as described, but which may also have the magnetic circuit of the motor poles entirely isolated from the magnetic circuit of the generator poles which are provided with equal M. M. F.'s, if a current be drawn from the secondary side of the machine, that is from between the negative main brush and the auxiliary brushes at a very small difference of potential, that is, if the ratio of conversion is large, which effect is obtained by reducing the M. M. F. on each generator pole equally, there will be a large circulating current flowing between the auxiliary brushes due to the want of balance in the armature. This want of balance is caused by the fact that the current is the lower half of the armature is larger than in the upper half. This produces an unbalanced M. M. F. in the wiring of the armature which causes a current to flow in the conductor joining the auxiliary brushes. This circulating current will be diminished as the potential difference on the secondary side is increased, by increasing the M. M. F. uniformly on the generator poles, although the current on the secondary side remains constant, and it will finally disappear when the secondary potential difference has attained a definite value. If the secondary potential difference is increased beyond this value, the direction of the circulating current will be changed, i. e. it will flow in the opposite direction across the auxiliary brushes. This circulating current is due to armature reaction for, if when the machine is on load and the potential difference in the secondary is small, the current in the generator part of the armature must be large compared with the current in the motor part of the armature. The M. M. F. of the generator part of the armature may therefore be considerably greater than the M. M. F. of the motor part of the armature. These M. M. F.'s are acting in opposition to one another, and their resultant when superimposed on the field system opposes the M. M. F. of the motor pole and helps the M. M. F. of the generator pole on one side of the main brushes, while the opposite effects take place on the motor and generator pole on the other side of the main brushes. Hence that auxiliary brush, which is on the side where the M. M. F. of the generator pole has been augmented will pick up a higher potential than the other auxiliary brush, causing a circulating current to flow between the auxiliary brushes.

When the M. M. F. of the motor part of the armature is greater than that of the generator part, the circulating current will flow in the opposite direction. This circulating current, if its magnitude and direction are not properly controlled, is objectionable for the following reasons:—1. It causes the speed of the armature to vary between wide limits. 2. It will, under certain circumstances, cause sparking at one or other of the auxiliary brushes. 3. It will, under certain circumstances, tend to prevent the desired relation between current and potential difference being obtained from the secondary side. 4. It will, under certain circumstances, tend to make the machine race dangerously. If properly regulated, this circulating current can be used to advantage as follows:—1. To control the speed. 2. To prevent sparking at either of the auxiliary brushes. 3. To assist in giving the desired relationship between the secondary current and the secondary potential difference. 4. To prevent dangerous racing.

If the machine is constructed with the magnetic circuit of the motor part magnetically connected to the magnetic circuit of the generator part, the results obtained are substantially the same. There is therefore, no particular benefit to be derived from magnetically isolating the motor part of the magnetic circuit from the generator part of the magnetic circuit.

By the aid of our invention we are able to make a machine constructed as above, whether having or not having the magnetic circuit of the motor part of the machine isolated from the magnetic circuit of the generator part of the machine, supply from its secondary terminals an approximately constant current at a varying potential difference, if provided with suitable windings hereinafter described.

The objects of this invention are therefore to provide in a machine of the kind described:—A. Means capable of regulating and governing the value of the circulating current between the auxiliary brushes, and at the same time producing a droop in the secondary potential difference as the secondary current increases. B. As a modification of the above, means for producing an automatically varying potential difference in the secondary with approximately constant current, and at the same time regulating and governing the circulating current in order to produce under these circumstances the desired results. The means provided for carrying out these objects are particularly described by reference to the diagrams in the accompanying drawings.

Figure 2:
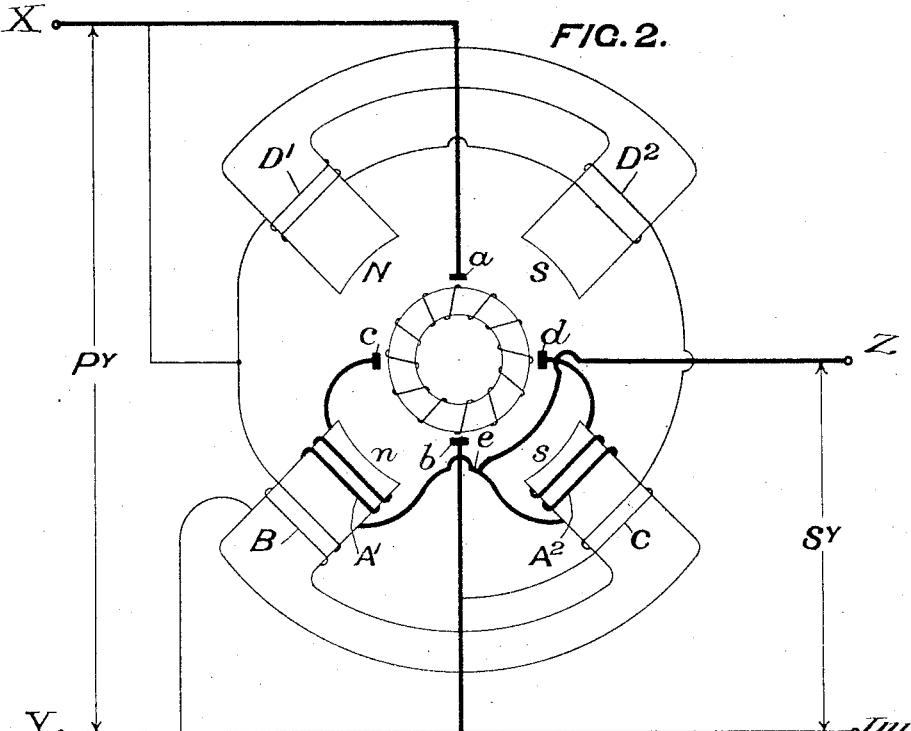

Figure 1 shows diagrammatically a machine in which the generator poles are provided with a series winding serving as a conductor between the auxiliary brushes; and Fig. 2 shows diagrammatically the addition to the machine shown in Fig. 1 of shunt windings upon the generator poles.

Referring to Fig. 1 it will be observed that the machine is provided with three terminals X, Y, and Z.

N and S are the motor poles and $n$ and $s$ are the generator poles of the machine.

$a$ and $b$ are the main brushes connected respectively to the terminals X and Z, and $c$ and $d$ are the auxiliary brushes joined by a conductor which is connected by a second conductor to the terminal Y of the machine.

X and Z are the terminals of the primary circuit and Y and Z are the terminals of the secondary circuit, the terminal Z being common to both the primary and secondary circuits.

The generator poles $n$ and $s$ are each provided with a series winding $A^1$, $A^2$, respectively, connected in series with and forming the conductor joining the auxiliary brushes $c$ and $d$, the connection to the terminal Y of the secondary circuit being made at the point $e$, as shown in Fig. 1, midway between the windings $A^1$ and $A^2$.

The motor poles N S are provided with shunt windings $D^1$, $D^2$ respectively, and the generator poles $n$, $s$, are provided with similar windings $D^3$, $D^4$, shunt field regulators $R^1$, $R^2$, being arranged in series with said shunt windings $D^1$, $D^2$, and $D^3$, $D^4$, respectively. By manipulating the shunt field regulators $R^1$, $R^2$, the M. M. F. of the windings $D^1$, $D^2$ and $D^3$, $D^4$ can be adjusted independently as will be well understood, to give the required values of magnetic flux on each side of the plane passing through the auxiliary brushes. Thus, in the action of the machine, a current flows from both brushes $c$, $d$, outward to the terminal Y, passing through the series coils $A^1$, $A^2$ in such direction as to oppose the normal shunt flux, thereby reducing the secondary voltage in proportion to the load. When, however, the armature is out of balance, as already described, an additional current flows out of one brush and into the other through the coils $A^1$, $A^2$, thus strengthening one pole and weakening the other and thereby tending to restore the magnetic balance of the armature.

As shown in Fig. 1 the series windings not only prevent circulating currents from passing between the auxiliary brushes, but produce a droop in the secondary voltage as the secondary current increases.

Referring to Fig. 2, a machine similar to that described with reference to Fig. 1 is shown, but instead of the plain shunt windings $D^3$ and $D^4$, we employ a winding B on one generator pole $n$ and a shunt winding C on the other generator pole $s$, the motor shunt windings $D^1$ and $D^2$ being connected between the main brush $a$ and the auxiliary brushes $c$ and $d$ or in any other suitable manner. The action of these windings depends on the fact that the magnetization produced by the winding B remains constant, while the magnetization produced by the winding C depends upon the voltage across the terminals Y, Z. Thus with a large ratio of transformation which, as already described, throws the armature out of balance, a weakening of the pole $s$ occurs which actually restores the magnetic balance of the armature. These windings have an additional advantage in that on short circuit, the voltage across Y, Z diminishes practically to zero and the flux produced by the coil C is therefore largely reduced. The total flux through the generator side of the armature is thus correspondingly reduced and the current in the secondary circuit can never attain an excessive value.

In operation the terminals X, Z are connected to the source of supply and the terminals Y, Z are connected to the arc lamp or other load which requires to be fed with constant current irrespective of the resistance in the circuit.

As stated above there are three external terminals in the machine, one, Y, connected to the terminal of the auxiliary brushes $c$ and $d$, one, X, connected to one ordinary brush $a$, and one, Z, connected to the other ordinary brush $b$. If any two terminals are selected for the purpose of supplying the motor current, the generator current may be taken between either of these and the third terminal. Hence it is immaterial how the connections of the primary and secondary circuits are made to the brushes, as is also the case with an ordinary motor generator, and consequently, it will be seen that motor current can be taken in between any two conductors and transformed current can be delivered between one of these and the third conductor.

It is to be understood that the invention is also applicable to machines of the multipolar type, and to these machines, as well as two pole machines, when fitted with commutating poles.

Having described our invention, what we claim, and desire to secure by Letters Patent is:—

1. A dynamo electric machine comprising a single ring armature, field magnets, said field magnets being isolated magnetically from each other, thereby dividing the field into a motor portion and a generator portion, three external terminals to said machine, a pair of main brushes each connected to one of said terminals, a pair of auxiliary brushes, a conductor wound as a series winding around the poles constituting said generator portion of said machine and joining the said pair of auxiliary brushes, and a connection between the middle point of said conductor and the third terminal of the machine.

2. A dynamo electric machine comprising a single ring armature, field magnets, said field magnets being isolated magnetically from each other, thereby dividing the field into a motor portion and a generator portion, three external terminals to said machine, two of said terminals being primary terminals, the third terminal being a secondary terminal, and one of said primary terminals being common to primary and secondary, a pair of main brushes each connected to one of said primary terminals, a pair of auxiliary brushes, a conductor wound as a series winding around the poles constituting said generator portion of said machine and joining said pair of auxiliary brushes, the middle point of said conductor together with said common terminal forming the secondary terminals of the machine, and a shunt winding on one generator pole connected across the primary terminals and a shunt winding around the other generator pole connected across the secondary terminals.

In testimony whereof we have hereunto set our hands in presence of two subscribing witnesses.

JAMES COLQUHOUN MACFARLANE.
HARRY BURGE.

Witnesses:
ERNEST JOHN HILL,
HARRY J. STOPEN.

---

Copies of this patent may be obtained for five cents each, by addressing the "Commissioner of Patents, Washington, D. C."